Figure 1:
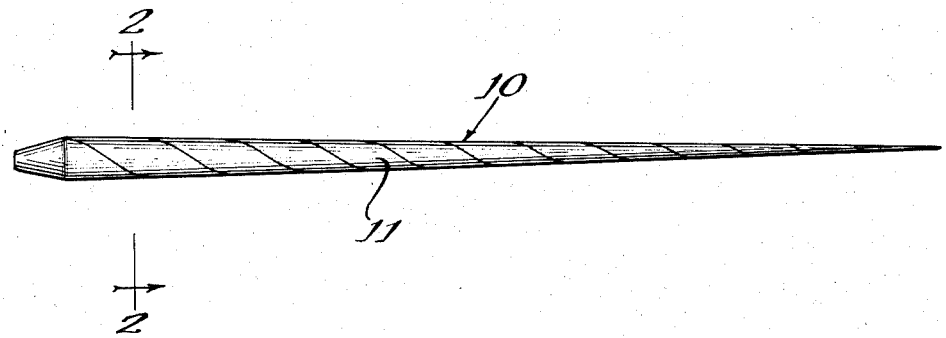

March 1, 1960　　　B. F. GURNEY　　　2,927,056
STERILIZING AND ANTISEPTIC COMPOSITIONS
Filed Sept. 23, 1958

Inventor:
Benjamin F. Gurney
By: Wallace and Cannon
Attorneys

2,927,056
STERILIZING AND ANTISEPTIC COMPOSITIONS

Benjamin F. Gurney, Glen Ellyn, Ill., assignor to Loyola University, Chicago, Ill., a corporation of Illinois, not for profit Application September 23, 1958, Serial No. 762,894

16 Claims. (Cl. 167—60)

This invention relates to a stearilizing antiseptic composition and more particularly to an endodontal sterilizing compostion and instrument, that is, to a combination bactericidal and fungicidal composition which is non-toxic and which is especially adapted for use in the dental profession in the sterilization of the endodontal area, and to an instrument for applying the same thereto. This application is a continuation-in-part of my application Serial No. 472,563, filed December 2, 1954, now abandoned.

Heretofore in the dental profession various bactericidal and fungicidal compositions have been used for the sterilization of endodontal cavities and among these have been concentrated sulphuric acid, phenol, paracresol, formaldehyde paracresol, paradichlorphenol, creosote and camphor. Some of the aforesaid agents have been effective against certain of the gram positive bacteria found in the endodontal cavity, some of them have been effective against certain of the gram negative bacteria found in the endodontal cavity, and some of them have been effective against certain of the fungi found in the endodontal cavity. However, insofar as I am aware, there has not heretofore been available to the dental profession a non-antibiotic sterilizing agent which is effective against a majority of the gram positive and gram negative bacteria, and the fungi which are found in the endodontal cavity.

Moreover, certain of the materials heretofore employed in endeavoring to sterilize the endodontal cavity, such, for example, as concentrated sulphuric acid, phenol, and others, have been subject to the disadvantage and objectionable feature which resides in the fact that they tend to denature, precipitate, mumify, burn, dissolve or otherwise degrade and destroy not only the tissues in the endodontal cavity but also the contiguous apical and periapical tissues and are thus somewhat dangerous while being otherwise unsatisfactory and require a great deal of experience in proper administration by a dental practitioner.

Accordingly, an object of the present invention is to provide a new and improved endodontal sterilizing agent in the form of a combination bactericidal and fungicidal compositon for use in the treatment and sterilization of an infected endodontal cavity which is effective against a majority of the gram positive bacteria and the gram negative bacteria as well as the fungi encountered in the endodontal cavity while, at the same time, being devoid of the objectionable featuers of prior art endodontal sterilizing materials including the tendency of certain of the latter to damage the tissues of the endodontal cavity and contiguous areas.

Another object of the present invention is to provide a new and improved endodontal sterilizing composition or combination bactericidal and fungicidal compositon for use in the treatment of the endodontal cavity and which may be put up and sold to the dental profession in such a manner as to be readily applied to the endodontal cavity.

A further object of the invention is to provide a new and improved sterile dental device or cone for the sterilization of the endodontal area.

An additional object of the present invention is to provide a new and improved sterilizing composition, which while being particularly adapted for use in the sterilization of the endodontal cavity, may also be used as a general non-toxic topical antiseptic solution for use in the oral cavity and elsewhere in and on the human body.

Another object of the present invention is to develop an endodontal sterilizing composition having excellent shelf life and low degradation in comparison to one of the individual components thereof.

An additional object of the invention is to provide in one aspect of the invention, a new and improved non-toxic high antiseptic powder for use in the treatment of various lesions, such, for example, as lesions of the ears, lesions of the foot, and the like.

Other objects will appear hereinafter.

Figure 2:
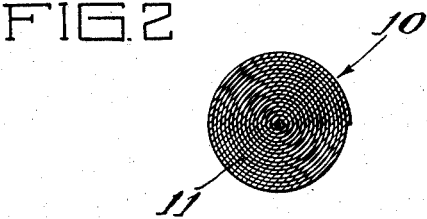

In the drawings:

Fig. 1 is an enlarged view of a sterilizing dental device or cone embodying the present invention; and Fig. 2 is a transverse sectional view of the same on line 2—2 of Fig. 1.

In the practice of the present invention I may prepare a typical form of the new endodontal sterilizing agent or new combination bactericidal and fungicidal composition in accordance with the following example:

Example No. 1

(a) To 10.0 ml. of sterile distilled water in a sterile container is added 0.300 gram of paraaminomethylbenzene sulfonamide, as an acid salt, namely, the hydrochloride (C.P.), whereupon the solution is heated, under cover, to boiling and maintained at a boil for a period of ten minutes.

(b) To 2.0 ml. of 95 percent ethyl alcohol in a sterile container is added, aseptically, 0.10 ml. of nitromethylfurfuryl ether and the whole is mixed thoroughly and, when the boiling of the aqueous solution, which is referred to in part (a) above, has been completed, the alcoholic solution is added to the aqueous solution, as aseptically as possible, and the whole is well mixed to an adjusted volume of 10 ml. of (a) and (b) by adding sterile water.

The new endodontal sterilizing agent or combination bactericidal and fungicidal composition for treatment of the endodontal cavity is then ready to be put up in such form as will enable it to be readily used in the dental profession, and this may be accomplished as follows:

Thus, the new endodontal sterilizing agent or combination bactericidal and fungicidal composition, prepared as in the foregoing Example No. 1, may be sprayed by means of a sterile syringe, aseptically, onto a multiplicity of, for example, 400 so-called absorbent sterile dental cones, such as are illustrated in Figs. 1 and 2 of the drawing, and wherein one of the same is generally indicated as 10, and comprises a general conical-shaped body 11 composed by a mass of spirally wound absorbent paper 11, the completed sterile dental device or cone being enlarged approximately seven (7) times as shown in Fig. 1 and being enlarged approximately 24.5 times as seen in Fig. 2.

These so-called absorbent sterile dental cones, as thus impregnated, may then be arranged in two sterile Petri dishes which have previously been heated to a temperature of 70° C., whereupon the sterile absorbent impregnated dental cones, thus treated, are placed in a desiccating atmosphere and dried to nearly constant weight. The thus impregnated sterile dental devices or cones are then ready for packaging and distribution to the dental profession.

I have found, in this connection, that the new impregnated sterile dental cones are markedly increased in effectiveness and their useful life prolonged if, prior to desiccation, they are placed under a moderately high vacuum for a few minutes and then returned to atmospheric pressure.

Other typical examples which may be employed in preparing the new endodontal sterilizing agent or combination bactericidal and fungicidal composition, in accordance with the practice of the present invention, are as follows:

*Example No. 2*

Paraaminomethylbenzene sulfonamide hydrochloride
(C.P.) _____ gms__ 1.50
Ethyl alcohol (95 percent) _____ mls__ 2.00
Nitromethylfurfuryl ether _____ mls__ 0.10
Water—quantity sufficient to provide 4.0 ml. of the solution, after boiling.

*Example No. 3*

Paraaminomethylbenzene sulfonamide hydrochloride
(C.P.) _____ gms__ 2.5
Ethyl alcohol (95 percent) _____ mls__ 2.00
Nitromethylfurfuryl ether _____ mls__ 0.10
Water—quantity sufficient to provide 4.0 ml. of the solution, after boiling.

*Example No. 4*

Paraaminomethylbenzene sulfonamide hydrochoride
_____ gms__ 1.00
Ethyl alcohol (95 percent) _____ mls__ 2.00
Nitromethylfurfuryl ether _____ mls__ 0.40
Water—quantity sufficient to provide 4.0 ml. of the solution, after boiling.

*Example No. 5*

Paraaminomethylbenzene sulfonamide hydrochoride
_____ gms__ 1.00
Ethyl alcohol (95 percent) _____ mls__ 2.00
Nitromethylfurfuryl ether _____ mls__ 1.00
Water—quantity sufficient to provide 4.0 ml. of the solution, after boiling.

It will be noted, in connection with the foregoing Examples 1 to 5, inclusive, that the permissible range of the paraaminomethylbenzene sulfonamide hydrochloride component of the new endodontal sterilizing agent, as and when used in the new sterile dental cones, is from not substantially less than 3 percent to not substantially more than 60 percent, by weight, as measured in grams per 100 cc., of the aqueous solution phase of the composition, and that the permissible range of the nitromethylfurfuryl ether component of the new endodontal sterilizing agent is from not substantially less than 5 percent to not substantially more than 50 percent, by volume, of the alcohol solution phase of the composition.

It will also be noted in this connection that approximately 60 percent is the upper limit of concentration of the paraaminomethylbenzene sulfonamide hydrochloride component of the aqueous solution phase of the composition and that at its aforesaid lower concentration of about 3 percent the paraaminomethylbenzene sulfonamide hydrochloric loses its therapeutic effect as and when used in the new impregnated sterile dental cones.

While, as set forth above, the new sterilizing composition is effective within the ranges and concentration set forth above, when incorporated in and as the impregnating agents in the new sterile absorbent dental cones, it may also be used effectively as a general non-toxic sterilizing agent or solution which is high in anti-fungal and anti-fungicidal properties, and for such purposes I have found that the new sterilizing solution is effective if the paraaminomethylbenzene sulfonamide hydrochloride, or equivalent water-soluble salt, component of the aqueous phase thereof is employed therein within a range of from about sixty (60) percent to three (3) percent or even less, by weight as measured in grams per 100 cc., of the aqueous solution phase of the composition. Likewise the nitromethylfurfuryl ether component of the new composition, when used as a topical antiseptic may be varied and employed with good results in a concentration of from fifty (50) percent to five (5) percent of the alcohol phase of the composition, by volume.

Thus in the practice of the present invention I may employ the new composition as a topical antiseptic solution such, for example, as a mouth wash, in accordance with the formulae set forth in the following examples in which the water and alcohol phases or components of the composition, embodying the quantities set forth in the following examples, are compounded in accordance with the procedure set forth in parts (*a*) and (*b*) of the foregoing Example No. 1:

*Example No. 6*

Paraaminomethylbenzene sulfonamide hydrochloride
_____ gms__ 10
Ethyl alcohol (95 percent) _____ mls__ 1.00
Nitromethylfurfuryl ether _____ mls__ 1.00
Cudbear (coloring dye) _____ gms__ 0.10
Methyl salicylate _____ mls__ 0.10
Water (C.P.) quantity sufficient to provide 100 ml. of solution

*Example No. 7*

Paraaminomethylbenzene sulfonamide hydrochloride
_____ gms__ 1.00
Ethyl alcohol (95 percent) _____ mls__ 1.00
Nitromethylfurfuryl ether _____ mls__ 1.00
Cudbear (coloring dye) _____ gms__ 0.10
Methyl salicylate _____ mls__ 0.10
Water (C.P.) quantity sufficient to provide 100 ml. of solution

*Example No. 8*

Paraaminomethylbenzene sulfonamide hydrochloride
_____ gms__ 0.001
Ethyl alcohol (95 percent) _____ mls__ 1.00
Nitromethylfurfuryl ether _____ mls__ 1.00
Cudbear (coloring dye) _____ gms__ 0.10
Methyl salicylate _____ mls__ 0.10
Water (C.P.) quantity sufficient to provide 100 ml. of solution

*Example No. 9*

Paraaminomethylbenzene sulfonamide hydrochloride
_____ gms__ 4
Ethyl alcohol (95 percent) _____ mls__ 4.0
Nitromethylfurfuryl ether _____ mls__ 4.0
Cudbear (coloring dye) _____ gms__ 0.10
Cinnamon oil _____ mls__ 0.10
Water (C.P.) quantity sufficient to provide 100 ml. of solution

*Example No. 10*

Paraaminomethylbenzene sulfonamide hydrochloride
_____ gms__ 3.00
Ethyl alcohol (95 percent) _____ mls__ 1.00
Nitromethylfurfuryl ether _____ mls__ 0.10
Cudbear (coloring dye) _____ gms__ 0.10
Cinnamon oil _____ mls__ 0.10
Water (C.P.) quantity sufficient to provide 100 ml. of solution

*Example No. 11*

Paraaminomethylbenzene sulfonamide hydrochloride
_____ gms__ 2.00
Ethyl alcohol (95 percent) _____ mls__ 1.00
Nitromethylfurfuryl ether _____ mls__ 0.001
Cudbear (coloring dye) _____ gms__ 0.10
Cinnamon oil _____ mls__ 0.10
Water (C.P.) quantity sufficient to provide 100 ml. of solution In addition to its use as a topical antiseptic solution, as set forth above, the new composition may be employed as a topical antiseptic powder for use in areas outside the oral cavity and for such uses, for example, as in the treatment of ear lesions, foot lesions, and the like, where a non-toxic topical high antiseptic powder is desired. Such a formula is indicated in the following example:

Example No. 12

In order to prepare the new topical powder antiseptic I may employ any of the formulae set forth in the foregoing Examples Nos. 6 to 11, inclusive, compounded in accordance with the procedure set forth in parts (a) and (b) of Example No. 1, whereupon the same may be intimately mixed with sufficient talc, or like finely divided or powdered mineral vehicle or carrier, to form 100 grams of the dried mixture, and then dried, whereupon the resulting product may be put up in cans or other suitable containers, for use.

The new composition may also be employed in the form of an antiseptic ointment, comprised of an unctuous base or vehicle, impregnated with the new composition ointment, and for this purpose may be prepared in accordance with either of the following examples, and with the aqueous solution phase and the alcohol solution phase thereof compounded in accordance with parts (a) and (b) of the foregoing Example No. 1.

Example No. 13

| | |
|---|---|
| Paraaminomethylbenzene sulfonamide hydrochloride _____ gms__ | 5.00 |
| Ethyl alcohol (95 percent) _____ mls__ | 3.00 |
| Nitromethylfurfuryl ether _____ mls__ | 3.00 |
| Polyhydric alcohol (Tween 80) _____ mls__ | 20.00 |
| Petrollatum (melted) quantity sufficient to make 100 gms. of the ointment. | |

Example No. 14

| | |
|---|---|
| Paraaminomethylbenzene sulfonamide hydrochloride _____ gms__ | 4.00 |
| Ethyl alcohol (95 percent) _____ mls__ | 2.00 |
| Nitromethylfurfuryl ether _____ mls__ | 2.00 |
| Polyhydric alcohol (Tween 80) _____ mls__ | 12.00 |
| Carbowax (melted) quantity sufficient to make 100 gms. of ointment. | |

While I have specified that the paraaminomethylbenzene sulfonamide employed in the foregoing examples is in the form of the hydrochloride, it is to be understood, of course, that other water soluble salts of paraaminomethylbenzene sulfonamide such, for example, as the sulphate and the phosphate, may be employed in lieu thereof, in equivalent amounts.

While the exact nature thereof is not clearly understood, I believe that a chemical reaction takes place between the paraaminomethylbenzene sulfonamide salt and the nitromethylfurfuryl ether when the aqueous and alcohol solution phases or components of the new composition are mixed together and that the desirable advantages and characteristics of the new composition are due, in a substantial measure, to the reaction product thus formed.

As mentioned above, common practices insofar as endodontia are concerned involve techniques which normally require highly specialized sterilizing mechanical skills on the part of the dental practitioner, and in fact clinics are maintained whereat dental practitioners are trained over a substantial period of time in a particular sterilizing technique. This has been due to a large part because of the fact that the profession has not had available an endodontal antiseptic solution which can be stored on the shelf, so to speak, and used over prolonged periods of time with assurance on the part of the dentist that the endodontal antiseptic solution is fully effective in the infection realms mentioned above. For instance, the shelf life of nitromethylfurfuryl ether per se is but at most a few months whereafter there is almost complete loss of therapeutic effectiveness, but in contrast, the product of the present invention obtained from nitromethylfurfuryl ether in the presence of paraaminomethylbenzene sulfonamide shows a stability on the shelf and continued effectiveness of greater than two years as evidenced by the fact that dental cones impregnated with the same are now known to have a half-life of at least two years, and moreover such mixture or reaction product used for topical treatment has a stability and continued activity of greater than seven months as shown by test data extending throughout and up to this seven month period, these data having been collected at Loyola University School of Dentistry, Chicago College of Dental Surgery.

It should be pointed out that in accordance with the general clinical use to be described hereinafter and conducted at the aforesaid college, treatment of only the most difficult cases of endodontal infections was successful in ninety-six percent of such cases, the respective patients being cured of the infection and discharged. Thus, in the first sitting the tooth was opened and subjected to medication by a topical solution and impregnated cones wherein the topical solution was obtained by mixing 5 percent by weight of a water-soluble salt of paraaminomethylbenzene sulfonamide and 0.08 percent by weight of nitromethylfurfuryl ether, in water, and impregnation of the dental paper points was obtained from a solution the composition of which was 20 percent of said sulfonamide and 4 percent of said ether in water, both the topical and impregnating solutions having been prepared by first dissolving the ether in twice its volume of alcohol and then adding this to a water solution of the sulfonamide with vigorous stirring to produce the final percent by weight (in water) concentration. In the second sitting, a culture was taken and the canal subjected to biomechanical preparation and further medication by the aforesaid topical solution and impregnated cones. In the third sitting, a culture was taken and further treatment and medication performed as in the second sitting. On the fourth sitting, the canal was filled and the tooth sealed. In 183 cases, the average number of sittings was 4.16 in contrast to a normal expectancy of five or six sittings. Thus, the present invention is characterized by unusually high clinical efficiency, low toxicity, high shelf life and lack of culture problems, but the really striking feature of the present invention is that this material can be used easily by the average dentist with a minimum of training due primarily to simplicity of use and in part to prolonged shelf life.

It should be pointed out that this unexpected shelf life shows up in accelerated decomposition or deterioration tests evidenced by color formation. Thus, an accelerated decomposition or deterioration of nitromethylfurfuryl ether can be obtained by bubbling air through an alcohol solution thereof, and it should be pointed out that it has been found that this is due to the reducing property rather than the oxidizing property of air. In the accelerated testing it was found that color formation of the nitromethylfurfuryl ether solution was greatly suppressed by the presence of paraaminomethylbenzene sulfonamide.

It will be realized that paraaminomethylbenzene (paraaminotoluene sulfonamide) is not typical of the ordinary sulfonamide wherein an amino group is in para position to sulphur attached to the benzene ring, thus:

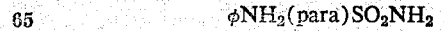

$\phi NH_2(para)SO_2NH_2$ but rather is formulated as follows:

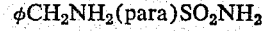

$\phi CH_2NH_2(para)SO_2NH_2$

The former product, the ordinary sulfonamide, is practically useless for treatment of endodontal infections inasmuch as it is rendered innocuous by the presence of paraaminobenzoic acid which results from the hydrolysis of the local anesthetic used by the dental practitioner incidental to endodontal exploration.

It will thus be seen from the foregoing description that the present invention provides a new and improved substantially non-toxic sterilizing agent or antiseptic or combination bactericidal and fungicidal composition for the treatment and sterilization of the endodontal cavity, and for use as a non-toxic topical sterile antiseptic wherever such a non-toxic topical antiseptic may be desired, and which has the desirable advantages and characteristics including those herein set forth and others which are inherent in the invention.

I claim:

1. As a new composition of matter, the product of a mixture of an aqueous solution of a water soluble salt of paraaminomethylbenzene sulfonamide and an alcohol solution of nitromethylfurfuryl ether.

2. As a new composition of matter, the product of a mixture of an aqueous solution of a water soluble salt of paraaminomethylbenzene sulfonamide selected from the group consisting of the hydrochloride, sulphate and phosphate, and an alcohol solution of nitromethylfurfuryl ether.

3. As a new composition of matter, the dried residue product of a mixture of an aqueous solution of a water soluble salt of paraaminomethylbenzene sulfonamide and an alcohol solution of nitromethylfurfuryl ether which is adapted for use as an endodontal sterilizing composition and in which the paraaminomethylbenzene sulfonamide salt component of the aqueous solution phase of the composition is initially present therein within a range of not substantially less than 3 percent nor substantially more than 60 percent, by weight, of the aqueous solution phase of the composition and in which the nitromethylfurfuryl ether component of the alcohol solution phase of the composition is initially present therein within a range of not substantially less than 5 percent nor substantially more than 50 percent, by volume, of the alcohol solution phase of the composition.

4. As a new composition of matter the dried residue product of an aqueous solution of a water soluble salt of paraaminomethybenzene sulfonamide and an alcoholic solution of nitromethylfurfuryl ether.

5. A new composition of matter as defined in claim 4 in which the water soluble paraaminomethylbenzene sulfonamide salt is selected from the group consisting of the hydrochloride, sulphate and phosphate.

6. As a new article of manufacture, an endodontal sterilizing instrument composed of a body of absorbent material impregnated with the dried residue product resulting from a mixture of an aqueous solution of a water soluble salt of paraaminomethylbenzene sulfonamide and an alcoholic solution of nitromethylfurfuryl ether.

7. An endodontal sterilizing instrument as defined in claim 6, in which the paraaminomethylbenzene sulfonamide component of the aqueous solution phase of the mixture is initially present therein within a range of not substantially less than 3 percent nor more than 60 percent, by weight, of the aqueous solution phase of the composition, and in which the nitromethylfurfuryl ether component of the alcohol solution phase of the composition is initially present therein within a range of not substantially less than 5 percent nor substantially more than 50 percent, by volume, of the alcohol solution phase of the composition.

8. As a new article of manufacture, an endodontal sterilizing instrument comprising a generally conical-shaped absorbent member impregnated with the dried residue of an intimate mixture of an aqueous solution of a water soluble salt of paraaminomethylbenzene sulfonamide and an alcoholic solution of nitromethylfurfuryl ether.

9. A new article of manufacture as defined in claim 8, in which the generally conical-shaped absorbent member is composed of a body of absorbent paper.

10. As a new composition of matter, a topical antiseptic solution composed of a mixture of an aqueous solution of a water soluble salt of paraaminomethylbenzene sulfonamide salt and an alcoholic solution of nitromethylfurfuryl ether, and in which the paraaminomethylbenzene sulfonamide component of the aqueous solution phase of the composition is initially present therein within a range of from sixty (60) percent to about three (3) percent, by weight, of the aqueous solution phase of the composition, and in which the nitromethylfurfuryl ether component of the composition is initially present in the alcohol solution phase thereof within a range of from fifty (50) percent to five (5) percent, by volume, of the alcohol solution phase of the composition.

11. As a new composition of matter, a topical powdered antiseptic comprised of a powdered vehicle impregnated with the dried residue of an intimate mixture of an aqueous solution of a water soluble salt of paraaminomethylbenzene sulfonamide and an alcoholic solution of nitromethylfurfuryl ether.

12. A new composition of matter, as defined in claim 11, in which the water soluble salt of paraaminomethylbenzene sulfonamide is selected from the group consisting of the hydrochloride, sulphate and phosphate.

13. A new composition of matter as defined in claim 11 in which the powdered vehicle is finely divided talc.

14. As a new composition of matter, an ointment comprised of an unctuous base or vehicle impregnated with a mixture of paraaminomethylbenzene sulfonamide and nitromethylfurfuryl ether.

15. As a new composition of matter, an ointment comprised of an unctuous base or vehicle impregnated with the reaction product of a water soluble salt of paraaminomethylbenzene sulfonamide and an alcohol solution of nitromethylfurfuryl ether.

16. As a new composition of matter, an ointment comprised of an unctuous base or vehicle impregnated with the reaction product of a water soluble salt of paraaminomethylbenzene sulfonamide selected from the group consisting of the hydrochloride, sulphate and phosphate, and an alcohol solution of nitromethylfurfuryl ether.

References Cited in the file of this patent

UNITED STATES PATENTS

| | | |
|---|---|---|
| 1,210,720 | Stephan | Jan. 2, 1917 |
| 1,512,274 | Caramanico | July 18, 1923 |
| 1,561,927 | Hrankowsky | Oct. 21, 1924 |
| 2,252,822 | Voganthaler | Aug. 19, 1941 |
| 2,668,135 | Vaichulis | Feb. 2, 1954 |

OTHER REFERENCES

Hawkin et al.: "The Sulphonamides," Lewis and Co. Ltd., London, 1950, pp. 30, 128, 129, QP981.582 H3.

"New and Nonofficial Remedies," Phila., 1953, pp. 59, 60.

"Modern Drug Encycl. and Therap. Index," 5th ed., 1952, Drug Publ. Inc., N.Y., pp. 407, 408.